United States Patent [19]

Gergoe et al.

[11] 4,249,771
[45] Feb. 10, 1981

[54] MANUALLY OPERATED ACTUATOR ARRANGEMENT

[75] Inventors: Bela Gergoe; Edmund F. Sarosy, both of Birmingham, Mich.

[73] Assignee: General Motors Corporation, Detroit, Mich.

[21] Appl. No.: 12,842

[22] Filed: Feb. 16, 1979

[51] Int. Cl.³ .............................................. B60J 1/00
[52] U.S. Cl. .................................... 296/146; 49/324; 49/357; 292/263; 74/89.17; 74/501 R
[58] Field of Search ........................ 296/85, 146, 201; 49/357, 352; 292/263, 225, 199, 125, DIG. 49, DIG. 5; 74/89.17, 501 R

[56] References Cited

U.S. PATENT DOCUMENTS

| | | | |
|---|---|---|---|
| 1,673,201 | 6/1928 | Pearsons | 49/357 |
| 2,140,865 | 12/1938 | Tuttle | 49/357 |
| 3,280,509 | 10/1966 | Werner | 49/352 |
| 3,740,093 | 6/1973 | Patzer | 296/146 |
| 3,974,753 | 8/1976 | Blomgren et al. | 292/263 |

FOREIGN PATENT DOCUMENTS 5000  9/1893  Sweden ..................... 49/357

Primary Examiner—John J. Love
Assistant Examiner—Ross Weaver
Attorney, Agent, or Firm—Herbert Furman

[57] ABSTRACT

A manually operated actuator arrangement includes a pair of actuators mounted forwardly and rearwardly of a swingably mounted vehicle window and connected by a translatable flexible member movable within a flexible conduit for concurrent operation. One actuator is mounted forwardly of the window in a position to be operated by front seat occupants and the other is mounted adjacent the rearward free swinging edge portion of the window and connected thereto by an overcenter type toggle linkage.

5 Claims, 12 Drawing Figures

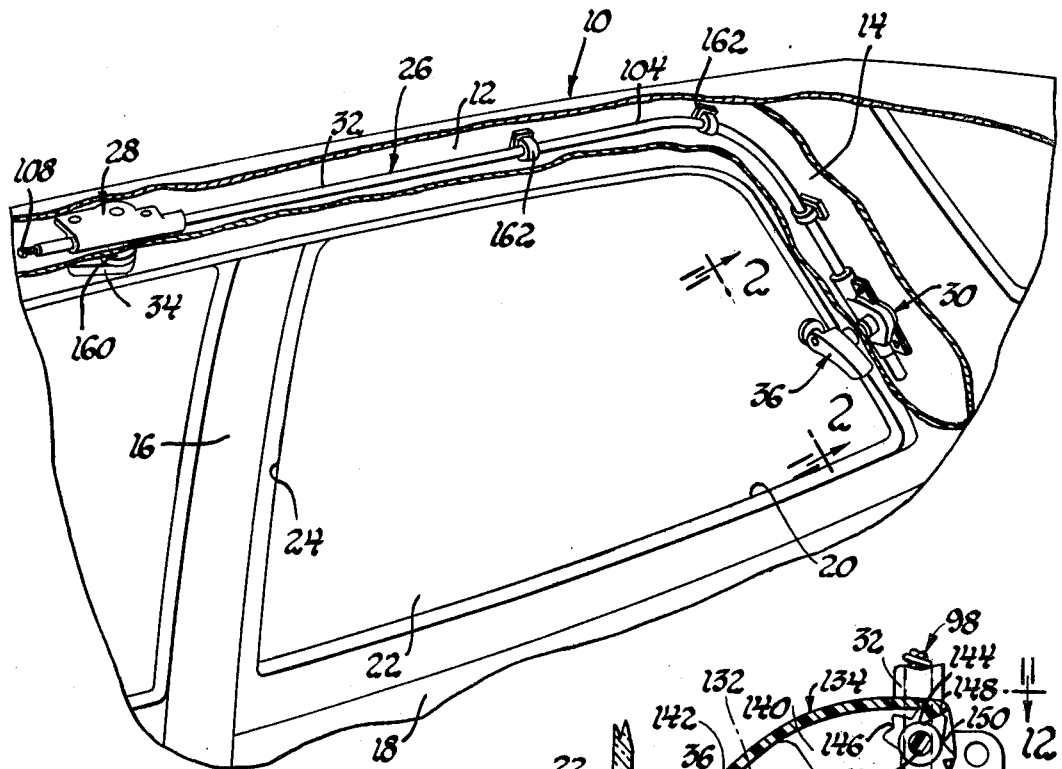

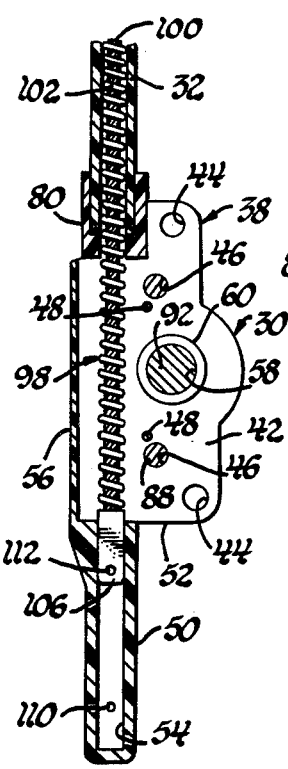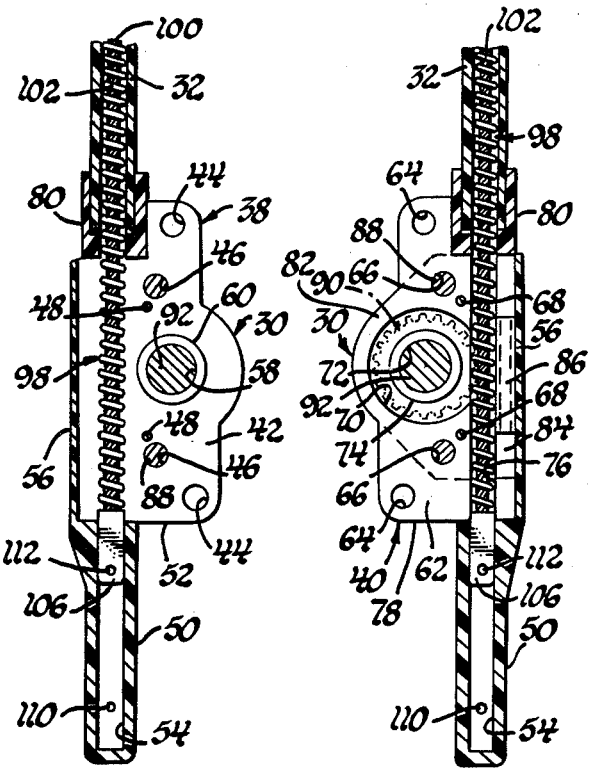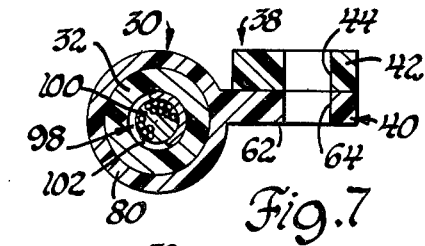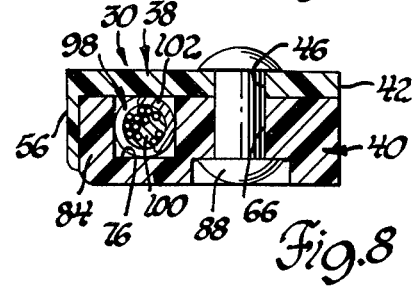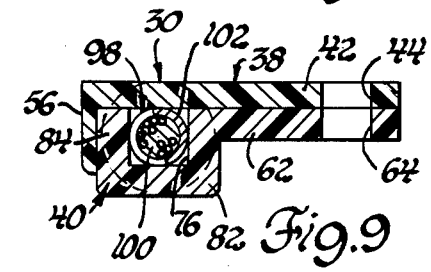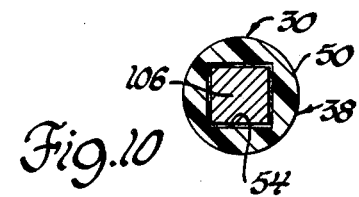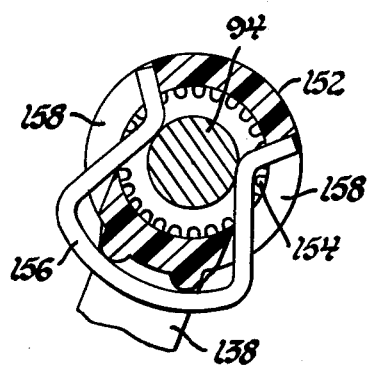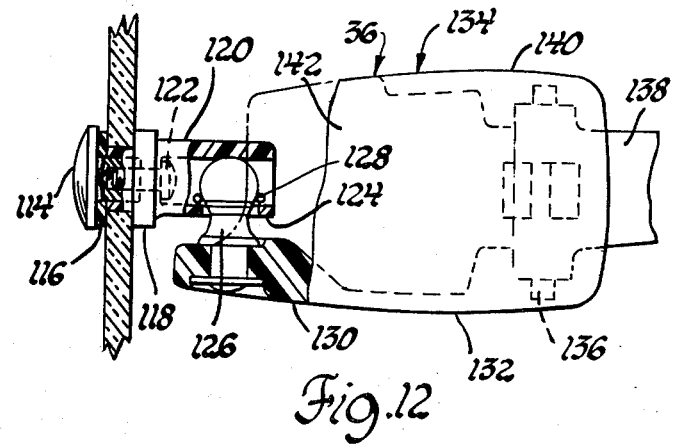

MANUALLY OPERATED ACTUATOR ARRANGEMENT

This invention relates generally to a manually operated actuator arrangement for vehicle body components and more particularly to such an arrangement for remotely effecting operation of a vehicle body component.

The actuator arrangement of this invention is particularly intended for effecting movement of a swingably mounted rear quarter window between open and closed positions with respect to a body opening. Normally such windows are moved between their open and closed positions by a manually operated overcenter toggle linkage interconnecting the rear free swinging edge portion of the window and the adjacent body structure. With such an arrangement, a remotely positioned occupant, such as a front seat occupant or driver, cannot effect movement of the window. It is also known to provide for power operation of such a window through the use of an electric motor driven flexible cable.

The actuator arrangement of this invention in its preferred embodiment includes a pair of motion converting actuators, one of which is mounted on the body roof rail forwardly of the swingably mounted forward edge portion of the window and the other of which is mounted on the body sail panel adjacent the rear free swinging edge portion of the window. The actuators are connected by a flexible conduit which extends along the roof rail and houses a linearly or translatable flexible member providing for concurrent operation of the actuators. The forward actuator is rotatably driven by a manually operable handle and converts the rotary movement of the handle into linear movement of the flexible member. The flexible member drives the rear actuator which converts linear movement of the flexible member into rotary movement of an overcenter type toggle linkage coupling the actuator to the window.

Each actuator is formed of easily molded plastic parts. Each includes a rotatable gear means which meshes with a continuous linear gear tooth on the flexible member. A storage extension for the flexible member is provided on one side of the actuator and a connector extension is provided on the other side. The latter extensions are connected to the flexible conduit so that the flexible member is completely enclosed within the storage extensions, actuators and conduit. The storage extensions are of square cross-section and a square plug on one end of the flexible member shifts within one such extension to block rotary movement of the member. The actuator arrangement is of very simple construction but yet permits a driver or other front seat occupant to manually open and close a rear quarter window. Heretofore this has not been possible.

One of the features of this invention is that it provides a manually operated actuator arrangement for remotely effecting operation of a vehicle body component. Another feature is that the actuator arrangement permits a driver or other front seat occupant to remotely effect movement of a swingable rear quarter vehicle window between open and closed positions with respect to a rear quarter window opening. A further feature is that the actuator arrangement includes a pair of actuators which are connected by a flexible conduit, with each actuator including rotary motion means coupled for concurrent operation by a linearly translatable flexible member movable through the conduit and through the actuators. Yet another feature is that each actuator includes oppositely extending storage and connector extensions, the former receiving the end portion of the flexible member during translation thereof and the latter receiving an end of the flexible conduit, with one of the end portions of the flexible member having a non-circular plug cooperable with the non-circular cross-section of one of the extensions to block rotary movement of the flexible member and provide for translation thereof through the actuators and conduit. Still another feature is that each actuator includes a pair of spaced housing members, one including the storage extension and the other including the connector extension, with the housing members being juxtaposed to each other to axially align the extensions in spaced relationship, with one of the housing members having an open passageway closed by the other and interconnecting the extensions. Still a further feature is that the housings cooperatively provide bearing portions for a rotatable gear which meshes with a continuous linear tooth of the flexible member to linearly translate the flexible member and concurrently rotate the gears of each actuator.

These and other features will be apparent from the following specifications and drawings wherein:

FIG. 1 is a partially broken away partial perspective view of the rear quarter area of a vehicle body having a rear quarter window movable between open and closed positions, with such movement being remotely effected by a manually operated actuator arrangement according to this invention.

FIG. 2 is an enlarged view taken generally along the plane indicated by line 2—2 of FIG. 1 and showing the overcenter toggle linkage interconnecting the rear actuator and the window, with such linkage being shown in full lines in window closed position and in dash lines in window open position.

FIG. 3 is a partially broken away view similar to FIG. 2 and showing the window in an intermediate open position.

FIG. 4 is a sectional view taken generally along the plane indicated by line 4—4 of FIG. 3.

FIG. 5 is a view taken generally along the plane indicated by line 5—5 of FIG. 4.

FIG. 6 is a view taken generally along the plane indicated by line 6—6 of FIG. 4.

FIG. 7 is a sectional view taken generally along the plane indicated by line 7—7 of FIG. 2.

FIG. 8 is a sectional view taken generally along the plane indicated by line 8—8 of FIG. 2.

FIG. 9 is a sectional view taken generally along the plane indicated by line 9—9 of FIG. 2.

FIG. 10 is a sectional view taken generally along the plane indicated by line 10—10 of FIG. 2.

FIG. 11 is a sectional view taken generally along the plane indicated by line 11—11 of FIG. 4, and FIG. 12 is a broken away view taken generally along the plane indicated by line 12—12 of FIG. 3.

Referring now particularly to FIG. 1 of the drawings, a conventional vehicle body designated generally 10 includes roof rail structure 12, sail panel structure 14, pillar structure 16, and rear quarter panel structure 18 which cooperatively define a rear quarter window opening 20. A rear quarter window 22 has the forward edge portion 24 thereof hinged to the pillar structure 16 in a conventional manner.

The movement of the window 22 between its closed position, as shown, and an open position, not shown, wherein the rear or free swinging edge portion of the window 22 is displaced outboard of the body, is effected by a manually operated actuator arrangement 26 according to this invention. Generally such actuator arrangement includes a forward actuator 28, a like rearward actuator 30 and a flexible conduit 32 which interconnects the actuators and contains a flexible translatable member for concurrently operating both actuators. The actuator 28 is driven by a manually operated handle 34 and is located forwardly of the pillar structure 16 in a position to be operated by a front seat occupant. The actuator 30 is driven by the translatable member when handle 34 is operated and is connected to the rear or free swinging edge portion of window 22 by an overcenter type toggle linkage 36.

The actuators 28 and 30 are generally of like structure, with actuator 28 being conventionally mounted on the roof rail structure 12 of body 10 and the actuator 30 being conventionally mounted on the sail panel structure 14 of the body adjacent the opening 20. Since both actuators are generally of like structure, only actuator 30 will be particularly described and it will be understood that actuator 28 is of the same structure unless otherwise noted.

As best shown in FIGS. 3 through 9, the actuator 30 includes a first housing member 38 and a second housing member 40 which are generally juxtaposed to each other and are formed of molded plastic. The housing member 38 includes a generally planar flange portion 42 having pairs of spaced apertures 44 and 46 and a pair of spaced pins 48 integrally formed therewith. An integral hollow extension 50 extends outwardly from one side 52 of housing 38, with the extension being of circular outer cross-section and having a generally square shaped bore 54 therein as best shown in FIG. 10. Bore 54 opens to the flange portion 42 adjacent a thin lateral flange 56 at one edge thereof. The flange portion 42 further includes a circular opening 58 which is surrounded by an integral raised circular rib 60, both of which provide an integral bearing portion of the housing 38 as will be further described.

The housing member 40 includes an integral planar flange portion 62 provided with a spaced pair of openings 64 respective to the openings 44, a spaced pair of openings 66 respective to the openings 46 and a pair of bores 68 which are respective to and receive the pins 48 when the housing members are juxtaposed to each other as will be further described. The housing 40 includes a circular recess 70 in the base wall thereof opening to an integral bushing 72, FIG. 4, with such opening being surrounded by a circular rib 74. A generally square shaped cross-section open passageway 76 extends between the sides of the housing member 40 and tangentially intersects bore 70. The passageway 76 extends from one side 78 of the housing member 40 to an integral circular cross-section hollow extension 80 at the other side thereof. Housing member 40 further includes an integral generally triangularly shaped web portion 82 which covers part of flange portion 62 to permit the circular bore 70 to be provided with depth. The wall 84 at one edge of the housing member providing the outer wall of passageway 76, is slightly recessed opposite that portion of the bore 70 opening to the passageway, to house a generally U-shaped spring metal clip 86.

When the hollow members are juxtaposed to each other as shown in FIGS. 2, 3 and 4, the flange portions 42 and 62 are planar abutted to align openings 44 and 64 and openings 46 and 66, insert the pins 48 into the bores 68, and align the sides 52 and 78. The flange portion 42 covers the open passageway 76 of the housing member 40 and the lateral flange 56 overlaps the wall 84. The pssageway 76 is axially aligned with the extension 50 whereby this extension, the passageway and the extension 80 are all axially aligned with each other through the actuator 30.

The housing members are riveted to each other at 88 as shown in FIG. 8, with such rivets extending through the aligned pairs of openings 46 and 66. The aligned pairs of openings 44 and 64 provide for conventional mounting of the actuator on the vehicle body sail panel structure, FIG. 1.

A gear 90, FIG. 4, is located in recess 70 and has its shaft portions 92 and 94 respectively journalled in the aperture 58 and bushing 72 of members 38 and 40. A wavy type thrust washer 96 is located between the gear and the rib 60 to hold the gear in engagement with the rib 74.

A flexible motion transmitting member 98 includes a wound flexible core 100 and a spiral wrapped wire secured to the core and providing a continuous linear tooth 102. The member 98 is slidably received in the bore 54 of extension 50, the passageway 76, and the extension 80. The member 98 is also slidably received within conduit 32 which extends between the actuators 28 and 30 and has the ends thereof received within and secured to the extensions 80 of the actuators. The end of the member 98 which moves within extension 50 of actuator 30 is provided with a square shaped plug 106 to ensure that the member 98 translates but does not rotate.

The gears 90 of the actuators 28 and 30 mesh with the tooth 102 of member 98. Thus, upon rotation of either gear 90, the member 98 is translated to provide for concurrent rotation of the other gear 90.

The spring clips 86 prevent undue wear of walls 84 by tooth 102 due to lateral thrust on member 98 by gears 90. A bolt 108, FIG. 1, threaded into the end wall of extension 50 of actuator 28 acts as an adjustable limit stop for one way movement of member 98. Extension 50 of actuator 30 is provided with a transverse hole 110 which can be aligned with a transverse hole 112 of plug 106 to receive a shipping clip or wire so as to hold the member 98 against movement during shipment and also permit installation of the actuators on the vehicle without concern for the location of the member 98 with respect to the actuators.

The gear 90 of actuator 30 is connected to the free swinging edge portion of the window 22 as will now be described. As best shown in FIGS. 2, 3 and 12, an internally threaded bolt 114 extends through a resilient washer 116 and the bushed end 118 of a hollow semicylindrical attachment member 120. End 118 extends through an aperture of the window 22. A bolt 122 extends through the apertured base of member 120 and into the bolt 114 to secure the member 120 to the window. The one flat wall 124 of member 120 is apertured to receive the spherical head of a stud 126. An omega clip 128 having the head thereof and the legs thereof received in opposite slots through the member 120 underlies the head of stud 126 to pivotally and rotatably connect the stud to the member 120. The shank of the stud is connected to a thickened extension 130 of one wall 132 of a channel shaped toggle link 134 of molded plastic. Integral pins 136 at one enlarged end of a toggle link 138 are received in oppositely opening recesses in the walls 132 and 140 of link 134 to pivotally connect the links. The web 142 of link 134 is provided with an integral rib 144 adjacent one end thereof and the enlarged integral end of link 138 is provided with integral notches 146, 148 and 150 which intermittently detent with rib 144 to respectively define closed, FIG. 2, intermediate open, FIG. 3, and fully open, not shown, positions of window 22. The link 138 further includes a laterally extending integral extension 152 which slidably receives the shaft portion 94 of gear 90 of actuator 30. Extension 152 is internally splined at 154 to receive a splined end of the shaft portion 94 to thereby connect the link 138 to the gear 90 of actuator 30.

As shown in FIG. 11, an omega clip 156 has the base thereof engaging locating ribs of extension 152 and the legs thereof received in slots 158 of the extension and also in an annular slot of the shaft portion 94 to removably secure the extension on the shaft portion.

The shaft portion 94 of actuator 28 is secured to an integral extension 160 of the manually operable handle 34 in the same manner as the shaft portion 94 of actuator 30 is secured to the extension 152.

With reference to FIG. 1, the conduit 32 extends between the actuators 28 and 30 along the upper portion of the window opening 20 and is secured by conventional clips 162 to the roof rail structure 12 of the body 10. The actuator 28 is located forwardly of the pillar structure 16 and conventionally secured to structure 12 so that handle 34 is accessible to front seat occupants and to the driver for manual rotation. The actuator 30 is located adjacent the rear or free swinging edge portion of the window 22 and is conventionally secured to the sail panel structure 14. The axis of shaft portions 92 and 94 of gear 90 of actuator 30, the axes of pins 136 of link 138, and the axis of stud 126 are parallel to each other and located generally horizontally and longitudinally of body 10. In the prior art, such axes are normally located vertically of body 10.

When the window 22 is in closed position as shown in FIGS. 1 and 2, the toggle linkage provided by the links 134 and 138 is in an overcenter folded position since the axis of pins 136 are clockwise of a line through the axis of stud 126 and the axis of shaft portions 92 and 94. This holds the window in closed position under the seal pressure of the normal weather stripping, not shown, between the window 22 and the body opening 20.

If it is desired to open the window 22, handle 34 is rotated to rotate the shaft portions 92 and 94 and the gear 90 of actuator 28. The meshing of the gear 90 with the continuous tooth 102 of member 98 shifts this member rearwardly of the body to in turn rotate the gear 90 and the shaft portions 92 and 94 of actuator 30 counterclockwise as viewed in FIGS. 2 and 3. The link 138 is thereupon rotated counterclockwise to move the axis of pins 136 counterclockwise of shaft portions 92 and 94 and the axis of stud 126 and move the window 22 to an intermediate open position as rib 144 disengages from notch 146 and engages in notch 148 to releasably hold the window in this position. If it is desired to move the window 22 to a fully open position, the handle 34 is further rotated to rotate link 138 further counterclockwise and move the axis of pins 136 counterclockwise of a line through the axes of stud 126 and shaft portions 92 and 94, as indicated in dash lines in FIG. 2. The rib 144 disengages from notch 148 and engages in notch 150 to thereby releasably locate the window 22 in the fully open position. To close the window 22, the handle 34 is rotated in the opposite direction. It is believed that the operation of the actuator arrangement to move the window to closed position is apparent from the foregoing description.

Thus this invention provides an improved manually operated actuator arrangement for effecting movement of a vehicle body closure with respect to the body.

The embodiments of the invention in which an exclusive property or privilege is claimed are defined as follows:

1. A manually operated actuator arrangement for remotely effecting movement of a vehicle body component comprising, a pair of spaced actuators, one adapted to be mounted on the body adjacent the component and the other adapted to be mounted on the body remotely therefrom, each actuator including a pair of extensions and a passageway therethrough connecting the extensions, one extension being open and the other extension being closed, a conduit extending between the open extensions and cooperating therewith, the passageways, and the closed extensions to provide an enclosure, a flexible toothed member movable within the enclosure, cooperating means on the toothed member and at least one extension blocking rotary movement of the toothed member, gear means rotatably mounted in each actuator and meshing with the toothed member whereby rotary movement of one gear means effects linear translation of the toothed member and concurrent rotary movements of the other gear means, means connecting one gear means to an operator, and means connecting the other gear means to the vehicle body component.

2. A manually operated actuator arrangement for remotely effecting movement of a vehicle body component, comprising, an actuator including a first housing member provided with a bearing portion and a closed end extension, a second housing member juxtaposed to the first housing member and having a bearing portion aligned with the bearing portion of the first member and an open end extension in spaced aligned relationship to the extension of the first housing member, one of said housing members having an open passageway extending from the extension thereof to the extension of the other housing member and being closed by said other housing member, manually operated gear means rotatably mounted by said bearing portions, a flexible member translatable within said extensions and passageway and including gear teeth means meshing with said gear means, cooperating means on the flexible member and the closed end extension blocking rotary movement of the flexible member whereby rotary movement of the gear means effects linear translation of the flexible member, and means connecting the flexible member to a vehicle body component remotely of the actuator.

3. A manually operated actuator arrangement for effecting movement of a vehicle body component, comprising, an actuator including a first housing member having a planar portion provided with an annular bearing means and a closed end extension to one side thereof, a second housing member having a planar portion juxtaposed to the planar portion of the first housing member and including an annular bearing means aligned with the bearing means of the first housing member, said second housing member including an open end extension at the side thereof opposite the side corresponding to the one side of the first housing member an axially aligned with the extension of the first housing member, the planar portion of the second housing member having an open passageway extending from the extension thereof to the extension of the first housing member and being closed by the planar portion of the first housing member, gear means rotatably mounted by said bearing means, a flexible conduit connected to the open extension of the second housing member, a flexible member translatable within said conduit, said extensions and said passageway and including gear teeth means meshing with said gear means, cooperating means on the flexible member and one of the extensions blocking rotary movement of the flexible member whereby rotary movement of said gear means effects linear translation of the flexible member, means connecting the gear means to a manual operator, and means connecting the flexible member to a vehicle body component.

4. A manually operated actuator arrangement for remotely effecting movement of a vehicle body component, comprising, an actuator including a first housing member provided with an annular bearing portion and an elongated extension on one side thereof, a second housing member juxtaposed to the first housing member and having an annular bearing portion aligned with the bearing portion of the first member, said second member including an elongated extension at the side thereof opposite the side corresponding to the one side of the first member and axially aligned with the extension of the first member, one of said housing members having an open passageway extending from the extension thereof to the extension of the other member and tangentially intersecting the bearing portion thereof, said open passageway being closed by the other housing member, manually operated gear means rotatably mounted by said bearing portions, a flexible member translatable within said extensions and passageway and including gear teeth means meshing with said gear means, cooperating means on the flexible member and one of the extensions blocking rotary movement of the flexible member whereby rotary movement of the gear means effects linear translation of the flexible member, and means connecting the flexible member to a vehicle body component remotely of the actuator.

5. A manually operated actuator arrangement for effecting movement of a vehicle body component, comprising, a pair of spaced actuators, each including a first housing member provided with an annular bearing portion and an elongated extension on one side thereof, a second housing member juxtaposed to the first housing member and having an annular bearing portion aligned with the bearing portion of the first member, said second member including an elongated extension at the side thereof opposite the side corresponding to the one side of the first member and axially aligned with the extension of the first member, one of said housing members having an open passageway extending from the extension thereof to the extension of the other member and tangentially intersecting the bearing portion thereof, said open passageway being closed by the other housing member, gear means rotatably mounted by said bearing portions, a flexible conduit interconnecting like extensions of each actuator, a flexible member translatable within said conduit, said extensions and said passageway and including gear teeth means meshing with each of said gear means, cooperating means on the flexible member and one of the extensions blocking rotary movement of the flexible member whereby movement of one gear means effect linear translation of the flexible member and concurrent movement of the other gear means, means connecting one gear means to a manual operator, and means connecting the other gear means to a vehicle body component.

* * * * *